US012600549B2

(12) United States Patent
Le Loc'h et al.

(10) Patent No.: US 12,600,549 B2
(45) Date of Patent: Apr. 14, 2026

(54) HEADER BAG FOR PACKAGING AT LEAST ONE MEDICAL DEVICE

(71) Applicant: Becton Dickinson France, Le Pont de Claix (FR)

(72) Inventors: Clémentine Le Loc'h, Meylan (FR); Cédric Rivier, Voreppe (FR); Guillaume Lehee, Voreppe (FR); Jean-Marc Chabanon, Vif (FR)

(73) Assignee: Becton Dickinson France, Le Pont-de-Claix (FR)

( * ) Notice: Subject to any disclaimer, the term of this patent is extended or adjusted under 35 U.S.C. 154(b) by 183 days.

(21) Appl. No.: 18/035,588

(22) PCT Filed: Nov. 4, 2021

(86) PCT No.: PCT/EP2021/080607
§ 371 (c)(1),
(2) Date: May 5, 2023

(87) PCT Pub. No.: WO2022/096557
PCT Pub. Date: May 12, 2022

(65) Prior Publication Data
US 2023/0406595 A1 Dec. 21, 2023

(30) Foreign Application Priority Data
Nov. 6, 2020 (EP) ..................................... 20306345

(51) Int. Cl.
B65D 79/02 (2006.01)
B65D 33/00 (2006.01)
(Continued)

(52) U.S. Cl.
CPC ........... B65D 79/02 (2013.01); B65D 33/007 (2013.01); B65D 75/20 (2013.01); B65D 75/30 (2013.01);
(Continued)

(58) Field of Classification Search
CPC ...... B65D 79/02; B65D 33/007; B65D 75/20; B65D 75/30; B65D 81/2084; A61B 50/30;
(Continued)

(56) References Cited

U.S. PATENT DOCUMENTS

| 8,413,810 B2 * | 4/2013 | Merboth | ................ | A61B 50/30 |
| | | | | 206/204 |
| 11,577,900 B2 * | 2/2023 | Evanson | ................ | B65D 75/42 |

(Continued)

FOREIGN PATENT DOCUMENTS

| CN | 101081656 A | 12/2007 |
| CN | 103153803 A | 6/2013 |

(Continued)

*Primary Examiner* — Steven A. Reynolds
(74) *Attorney, Agent, or Firm* — The Webb Law Firm

(57) ABSTRACT

The disclosure relates to a header bag for packaging at least one medical device, including at least one sheet configured to be sealed to form an enclosure for the at least one medical device, the at least one sheet including at least an inner layer and an outer layer, the inner and outer layers being impervious to gas so that a vacuum can be created in a volume extending between the inner and outer layers, wherein the header bag further includes a pressure sensor arranged between the inner and outer layers and an RFID tag configured to communicate with the pressure sensor.

12 Claims, 6 Drawing Sheets

(51) Int. Cl.

| | | |
|---|---|---|
| *B65D 75/20* | (2006.01) | |
| *B65D 75/30* | (2006.01) | |
| *B65D 77/04* | (2006.01) | |
| *B65D 77/12* | (2006.01) | |
| *B65D 81/20* | (2006.01) | |
| *G01L 19/08* | (2006.01) | |

(52) U.S. Cl.
CPC ............ *B65D 77/04* (2013.01); *B65D 77/12* (2013.01); *B65D 81/2084* (2013.01); *G01L 19/086* (2013.01); *B65D 2203/10* (2013.01); *B65D 2203/12* (2013.01)

(58) Field of Classification Search
CPC ........ A61B 2050/314; A61B 2050/316; A61L 2202/181
USPC ................................................. 206/438, 484
See application file for complete search history.

(56) References Cited

U.S. PATENT DOCUMENTS

| | | | | |
|---|---|---|---|---|
| 2007/0222590 | A1 | 9/2007 | Posamentier | |
| 2011/0308984 | A1* | 12/2011 | Hennek | A45C 1/10 |
| | | | | 206/459.1 |
| 2014/0262901 | A1* | 9/2014 | Martino | B65D 25/00 |
| | | | | 206/459.1 |
| 2015/0306259 | A1* | 10/2015 | Deutschle | A61L 2/204 |
| | | | | 206/439 |
| 2016/0023833 | A1* | 1/2016 | Hallab | B65D 81/022 |
| | | | | 220/592.27 |
| 2018/0305083 | A1* | 10/2018 | Van Der Kevie | B65D 5/509 |
| 2018/0327160 | A1 | 11/2018 | Gaines et al. | |
| 2019/0011318 | A1* | 1/2019 | Wang | B65D 85/72 |
| 2019/0092499 | A1 | 3/2019 | Fournier et al. | |
| 2021/0402032 | A1* | 12/2021 | Nicolas | B32B 27/327 |
| 2022/0161957 | A1* | 5/2022 | Guidetti | G06K 19/07749 |

FOREIGN PATENT DOCUMENTS

| | | |
|---|---|---|
| CN | 205916519 U | 2/2017 |
| DE | 19840269 A1 | 3/2000 |
| EP | 2992959 A1 | 3/2016 |
| FR | 3049588 A1 | 10/2017 |
| JP | 200656599 A | 3/2006 |
| JP | 2017530441 A | 10/2017 |
| WO | 2016022607 A1 | 2/2016 |
| WO | 2020089156 A1 | 5/2020 |
| WO | 2020144574 A1 | 7/2020 |

* cited by examiner

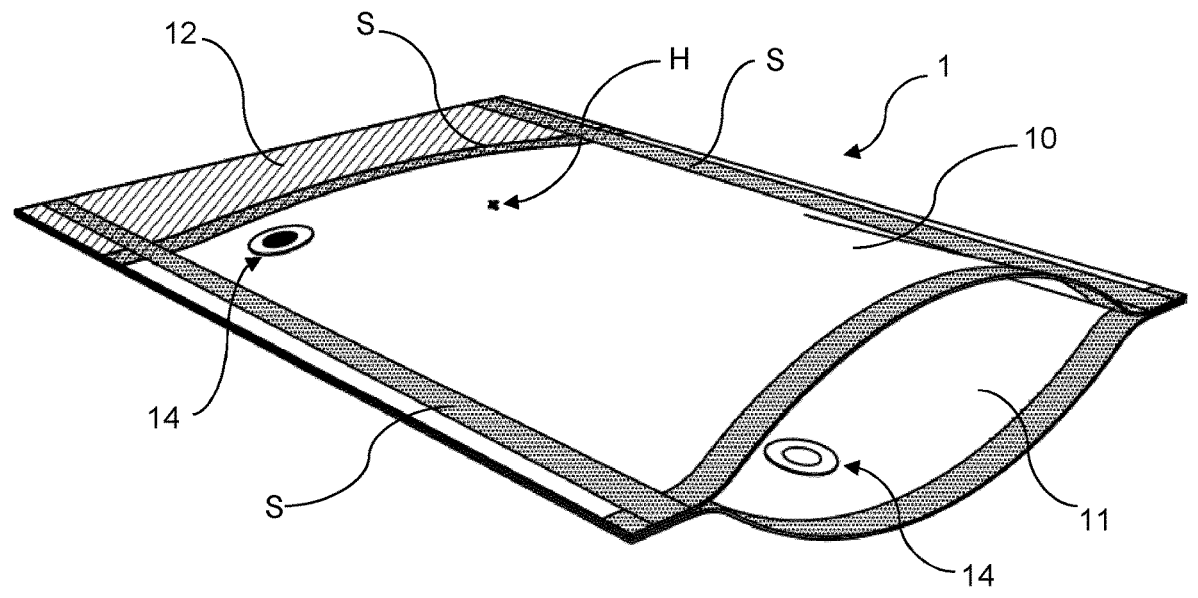
FIGURE 5
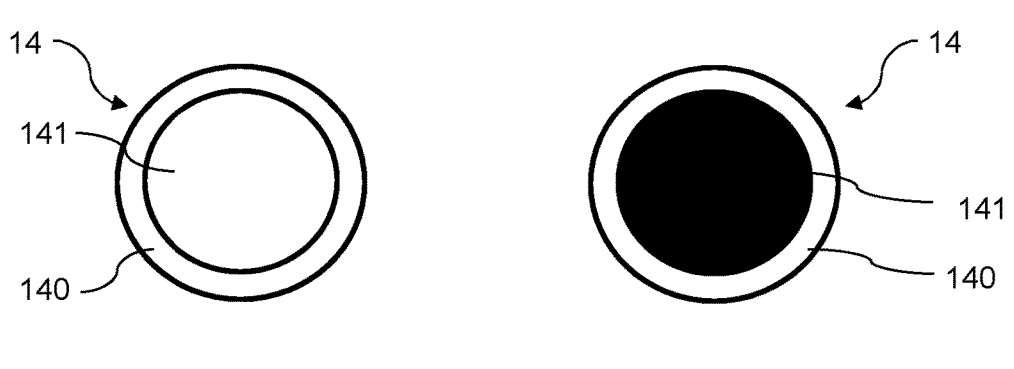
FIGURE 6A          FIGURE 6B

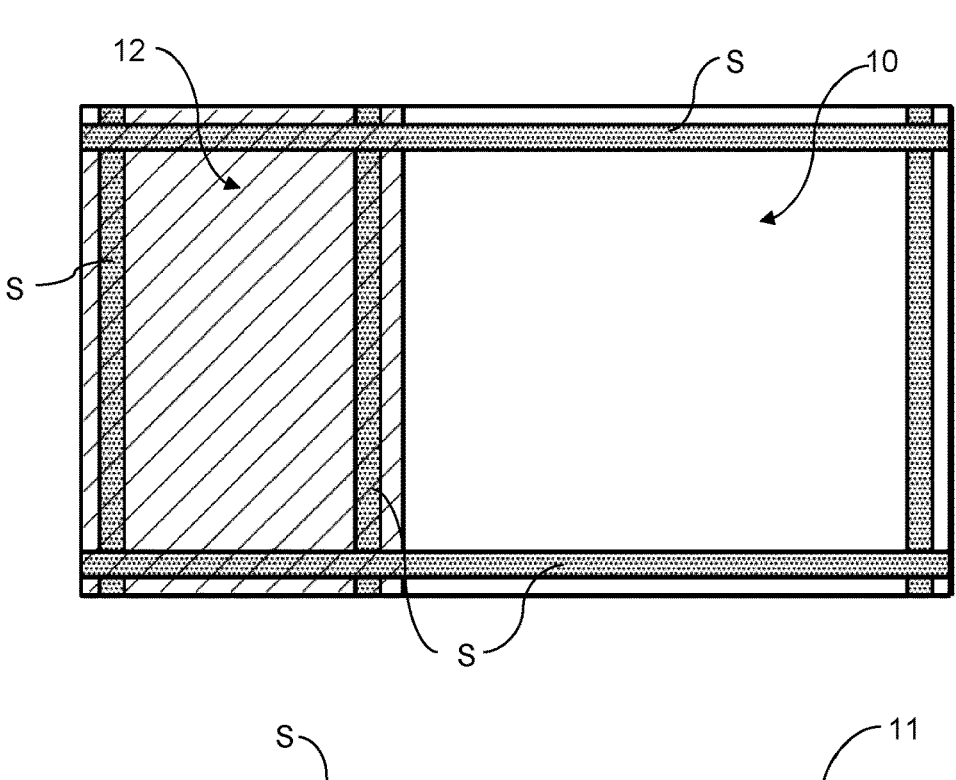
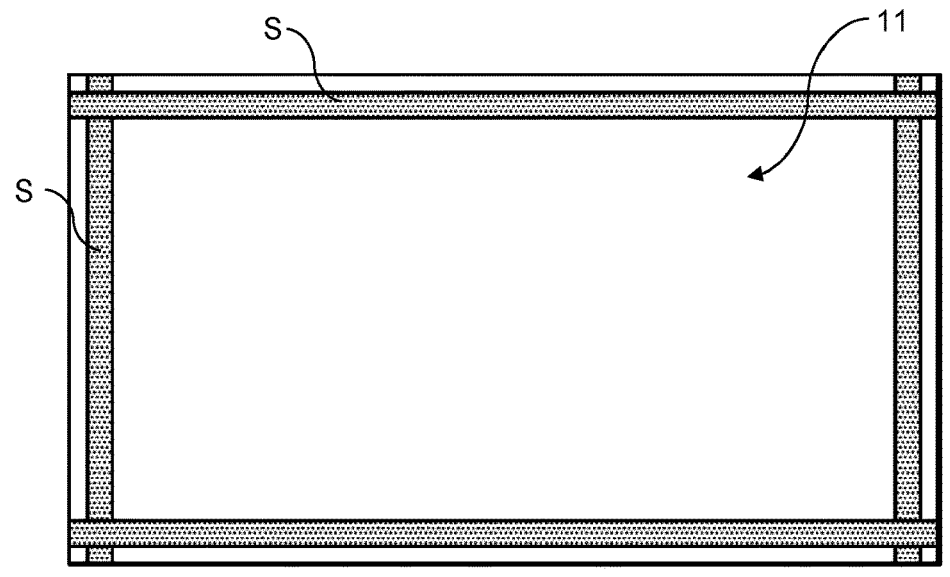
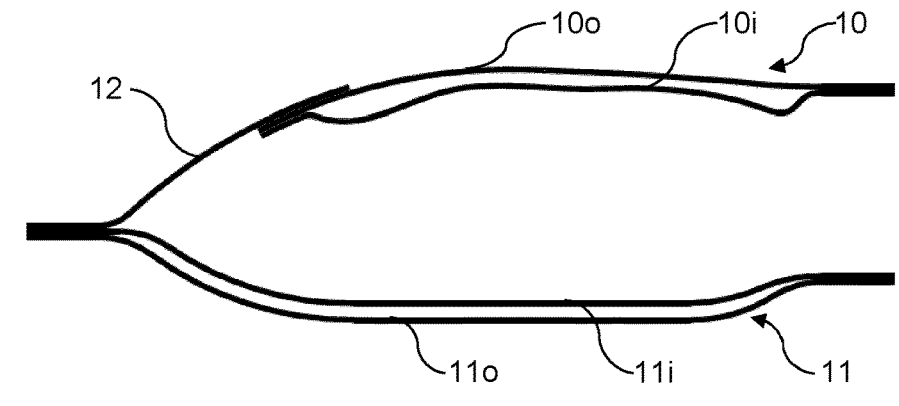
FIGURE 8

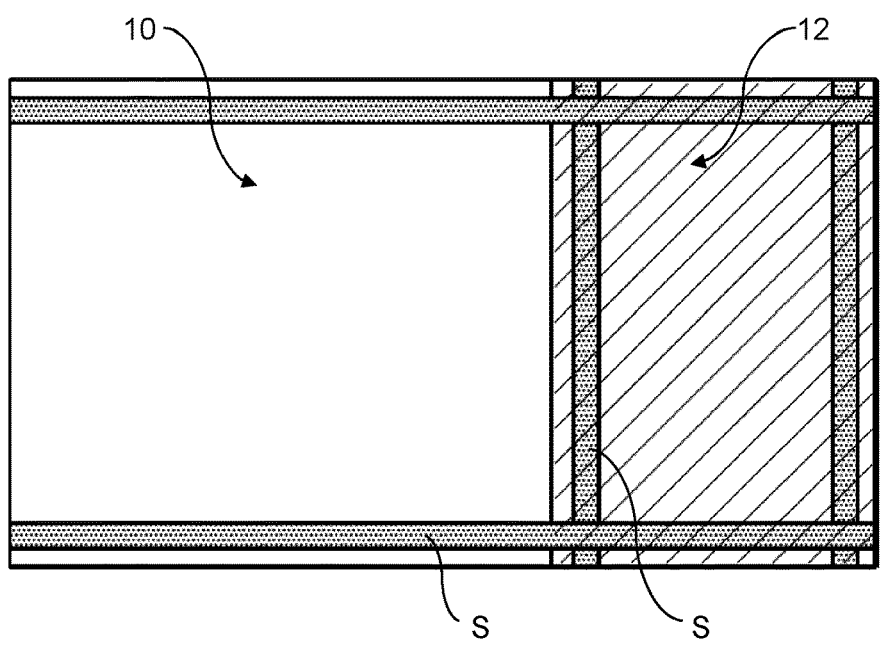
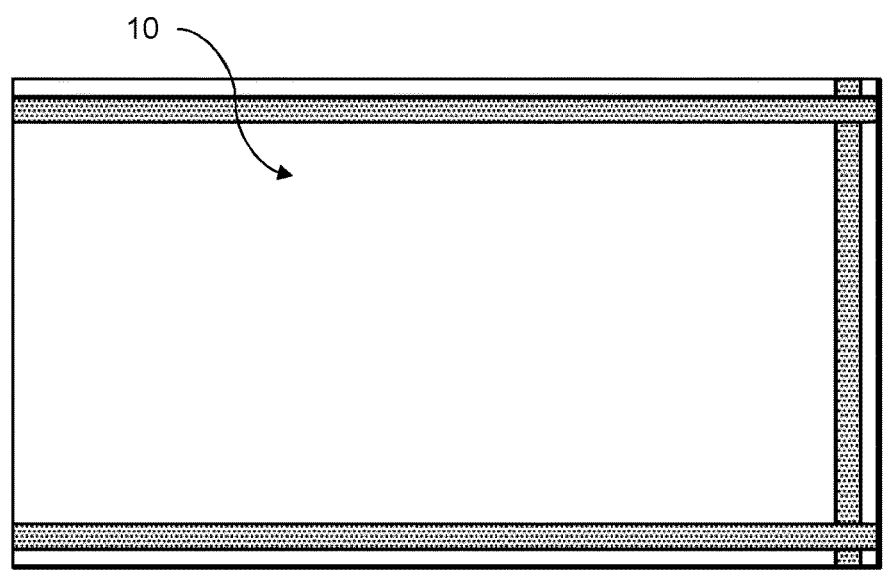
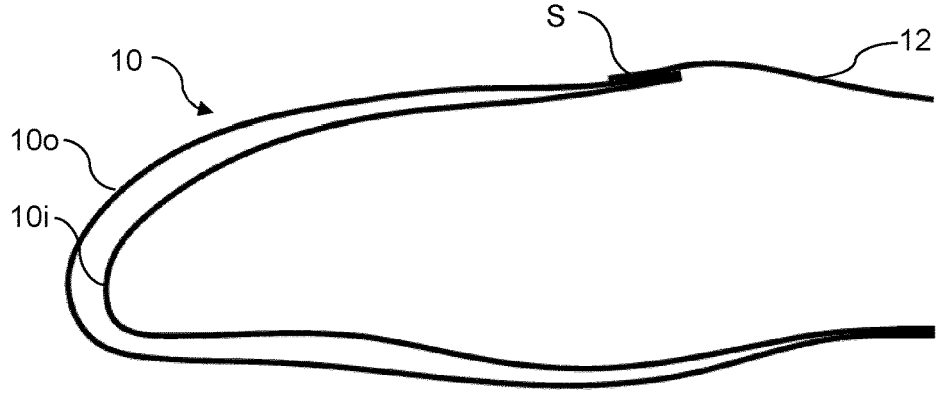
FIGURE 9

HEADER BAG FOR PACKAGING AT LEAST ONE MEDICAL DEVICE

CROSS-REFERENCE TO RELATED APPLICATIONS

This application is the United States national phase of International Application No. PCT/EP2021/080607 filed Nov. 4, 2021, and claims priority to European Patent Application No. 20306345.8 filed Nov. 6, 2020, the disclosures of which are hereby incorporated by reference in their entireties.

BACKGROUND OF THE INVENTION

Field of the Invention

The present invention relates to a header bag for packaging at least one medical device, a packaging comprising such a header bag and a process for packaging at least one medical device using such a header bag.

Background of Related Art

Medical devices may need to be transported from a first site to another site, for example when a first part of their processing is carried out in the first site and a second part of their processing is carried out in the second site. For example, medical containers such as syringes may be manufactured in a first site and then filled with a pharmaceutical composition in the second site. They may then be sent to a third site for storage before delivery to the patient.

To that end, bags may be used for packaging such medical devices in view of transportation from one site to another site, and possibly for storage at an end-user location.

In particular, said bags may be configured to preserve the sterility of the medical devices. To that end, the bags may be configured to provide a barrier to prevent foreign particles such as contaminants, including microorganisms, dust, plastic or any particles issued from the manufacturing and manutention processes from entering inside the bag.

In addition, although the medical devices may be produced in a clean room, a sterilization step may be implemented after their packaging to destroy any contamination. To that end, the bags may comprise a wall which is porous to gases and particularly to sterilization gases (e.g. ethylene oxide) and which thus allows said sterilizing gases to penetrate into the bag to be in contact with the medical devices.

The integrity of the bag has then to be maintained until opening for use of the medical device. Otherwise, there exists a risk that a contamination of the medical devices occurs, with possibly hazardous consequences for the patient.

During transportation, the bags comprising the medical devices are packaged in boxes intended to protect the medical devices and bags from mechanical constraints that may damage them. However, it cannot be excluded that a breach be made in a bag, for example in case it is in contact with a sharp object.

A loss of integrity of the bag may not be easily visible, e.g. in the case of a small breach formed in a wall of the bag. Thus, even if the sterilization bag is apparently undamaged, the medical devices may have been contaminated through the breach.

In order to anticipate such a contamination of the medical devices, a decontamination may be carried out at the point of use. However, such a decontamination, which is applied to all the medical devices contained in a same box, is expensive and time-consuming.

Thus, it would be desirable to carry out such a decontamination only for the medical devices of which the sterilization bag has been damaged.

There exist indicators of a loss of integrity of a whole packaging that may be placed in a bag and that are configured to change color due to a chemical reaction when the atmosphere inside the bag changes.

However, such indicators allow a detection of a loss of integrity only where the bag has been damaged and thus require a detailed inspection of the bag.

Moreover, such indicators cannot be used with bags comprising a porous wall to allow sterilization. Indeed, due to such a porous wall, the atmosphere inside and outside the bag is the same. Thus, a breach made in a wall of the bag would not change the atmosphere inside the bag and would thus not affect the color of the indicator.

SUMMARY OF THE INVENTION

A goal of the invention is to provide a header bag allowing easily detecting a loss of integrity, whether the bag includes or not a porous wall.

To that end, the invention provides a header bag for packaging at least one medical device, comprising at least one sheet configured to be sealed to form an enclosure for the at least one medical device, the at least one sheet comprising at least an inner layer and an outer layer, the inner and outer layers being impervious to gas so that a vacuum can be created in a volume extending between the inner and outer layers, wherein the header bag further comprises a pressure sensor arranged between the inner and outer layers and an RFID tag configured to communicate with the pressure sensor, for example to record a change of pressure detected by the pressure sensor.

The vacuum created between the inner and outer layers of the at least one sheet allows detecting a loss of integrity of the header bag. Indeed, a breach in at least one of the inner and outer layers results in a loss of vacuum between the layers. In particular, air or any other gas to which the damaged layer is exposed may penetrate between the layers. In some embodiments, said gas may be detected by a visual indicator which may be sensitive to humidity, for example.

In other embodiments, said gas may be detected by a pressure sensor associated with an RFID tag. In other embodiments, said gas may cause the inner and outer sheets to be separable from each other, and may thus be detected by pulling the layers away from each other to separate them.

In some embodiments, the header bag further comprises a porous wall sealed to the at least one sheet to form a part of the enclosure.

Said porous wall may be made of a non-woven material comprising high-density polyethylene fibres, coated cellulose fibres, and/or uncoated cellulose fibres.

In some embodiments, the header bag may comprise a single sheet configured to be folded and sealed onto itself to form the enclosure.

In other embodiments, the header bag may comprise at least two sheets configured to be sealed onto each other to form the enclosure.

In some embodiments, the header bag may comprise an indicator located between the inner and outer layers, the indicator being configured to change a visual aspect upon exposure to a variation of pressure or of gas concentration such as a humidity variation.

In some embodiments, the header bag may comprise a pull tab attached to the outer layer.

The inner and outer layers of each sheet may comprise one of the following materials: polyethylene, in particular low-density linear polyethylene, polypropylene, and polyethylene terephthalate.

According to another aspect, the invention provides a packaging for at least one medical device comprising the header bag described above. The at least one medical container is arranged in the sealed enclosure and the volume between the inner and outer layers of each sheet is under vacuum.

According to another aspect, the invention provides a process for packaging at least one medical device within such a header bag. Said process comprises (the steps not being necessarily carried out in the following order):

providing a header bag as described above (the header bag comprising at least one opening to allow placing the medical device(s) inside), arranging the at least one medical container in the enclosure, sealing the enclosure (closing the header bag), creating a vacuum between the inner and outer layers of the at least one sheet.

In some embodiments, the vacuum may be created in the at least one sheet before providing the header bag.

In other embodiments, the vacuum may be created in the at least one sheet when sealing the enclosure containing the at least one medical container.

BRIEF DESCRIPTION OF THE DRAWINGS

Additional features and advantages of the invention will be described below, with reference to the appended drawings, wherein:

FIG. 5 is a schematic representation of a header bag according to a second embodiment, including a visual indicator;

FIG. 6A is a schematic representation of a first visual aspect of the indicator of FIGURE FIG. 6B is a schematic representation of a second visual aspect of the indicator of FIG. 5;

FIG. 8 illustrates top, bottom and side views of a header bag according to an embodiment with two sheets configured to be sealed onto each other;

FIG. 9 illustrates top, bottom and side views of a header bag according to an embodiment with a single sheet configured to be sealed onto itself.

DESCRIPTION OF THE INVENTION

Figure 1:
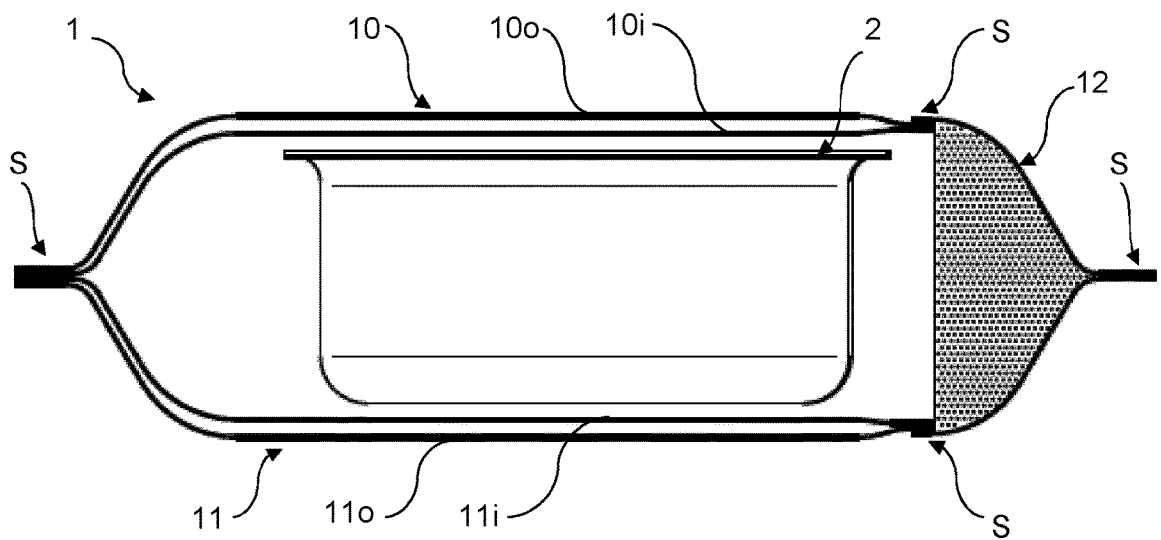
FIG. 1 is a schematic representation of a packaging according to a first embodiment.

The header bag comprises at least one sheet which is configured to be sealed to form an enclosure for one or more medical devices such as medical containers.

Said at least one sheet is made of two layers that are superimposed and sealed together along their periphery to form the sheet. One layer, called outer layer, defines the outside surface of the header bag and is exposed to the atmosphere surrounding the header bag. The other layer, called inner layer, defines the inner surface of the header bag and is exposed to the same atmosphere as the at least one medical device.

The sealing of the layers may be carried out by locally heating a region of the periphery of the layers and applying a mechanical pressure to promote welding of the materials of the two layers along a continuous line. The sealing of the layers thus defines a sealing region where both the outer layers and the inner layers are welded together. The layers may be made of a same polymeric material or of compatible polymeric materials, i.e. polymers having different molecular structures but that still can be welded to each other. In preferred embodiments, at least one of the inner and outer layers may be made of: polyethylene, in particular low-density linear polyethylene (LLDPE), polypropylene, and/or polyethylene terephthalate.

Both inner and outer layers, as well as the sealing region which is continuous, are impervious to gas, such as oxygen, air, carbon dioxide and/or water vapor, for instance impervious to air. By impervious to gas is meant in the present text a layer that has a low permeability to gas such as air or oxygen. For example, a low permeability to oxygen is a permeability less than 1,000 $cm^3/25$ $\mu m/24$ h. Said permeability may be measured by any machine known from the skilled person, for example with a permeation oxygen analyzer (OxyPerm, Ox-Tran 2.22) according to the ASTM D3985 (Standard Test Method for Oxygen Gas Transmission Rate Through Plastic Film and Sheeting Using a Coulometric Sensor) method.

In this way, a vacuum can be created in the volume extending between said layers, during or after sealing of the sheet. For example, the vacuum may be created thanks to vacuum sealing machine such as MAGVAC™ machines, or by firmly applying the two layers together. When such a vacuum is created, the inner and outer layers strongly adhere to each other and are not separable even when one tries to pull the layers from each other. By vacuum, is meant in the present text a pressure less than 400 mbar, or preferably less than 250 mbar, for instance a pressure comprised between 50 mbar and 250 mbar.

In preferred embodiments, the medical devices comprise medical containers, such as syringes, for instance pre-filled syringes, cartridges or vials.

The one or more medical devices may be enclosed directly within the header bag, without any intermediate packaging, or they may be arranged in an intermediate packaging such as a tub and/or a nest, which is itself enclosed within the header bag.

Preferably, the header bag may comprise a wall which is porous to gas—in particular to sterilization gases (e.g. ethylene oxide). By porous, is meant in the present text that the material, thickness and permeability to gas of said wall are configured to allow a sufficient flow of sterilizing gas to pass through the wall. In this way, the at least one medical device enclosed within the header bag may be exposed to a sterilizing gas which penetrates into the sealed header bag through the porous wall. In preferred embodiments, the porous wall may advantageously be made of a nonwoven material made of high-density polyethylene (HDPE) fibers, such as Tyvek™, which is frequently used to fulfill the function of the porous wall in a sterilizable header bag. In some embodiments, the nonwoven material may include coated cellulose fibres and/or uncoated cellulose fibres.

Contrary to the sheets, the porous wall may be formed of a single layer. The porous wall may be sealed to the sheet of the header bag by any means known by the skilled person, for example thermically sealed. The porous wall may be sealed to the inner layer, to the outer layer, to both layers forming the sheet.

However, the invention is not limited to such an embodiment and also covers a header bag which is fully impervious to air and does not comprise any porous wall, which may be suitable for example if the medical devices do not require any sterilization once they have been placed into the header bag.

FIG. 1 illustrates an embodiment of a header bag 1 enclosing a tub 2 containing medical containers (not shown).

The header bag comprises two sheets 10, 11 that are sealed together.

Each sheet 10, 11 comprises a respective inner layer 10i, 11i and an outer layer 100, 110.

Although a gap is represented between each inner layer and the respective outer layer to allow distinguishing both layers, the inner and outer layer forming each sheet are in fact in contact with each other due to a vacuum created between them during or after sealing of the sheet.

The header bag further comprises a porous wall 12 which is permeable to gas.

The porous wall is sealed to the sheets 10, 11 and on itself (the sealing regions being designated by reference S) to form a sealed enclosure for the tub 2.

The process for manufacturing such a header bag will be described below with reference to FIG. 8.

Instead of sealing two sheets together to form the header bag, it would also be possible to fold a single sheet on itself and then seal it on itself along its periphery (see FIG. 9 and the corresponding description).

Figure 2:
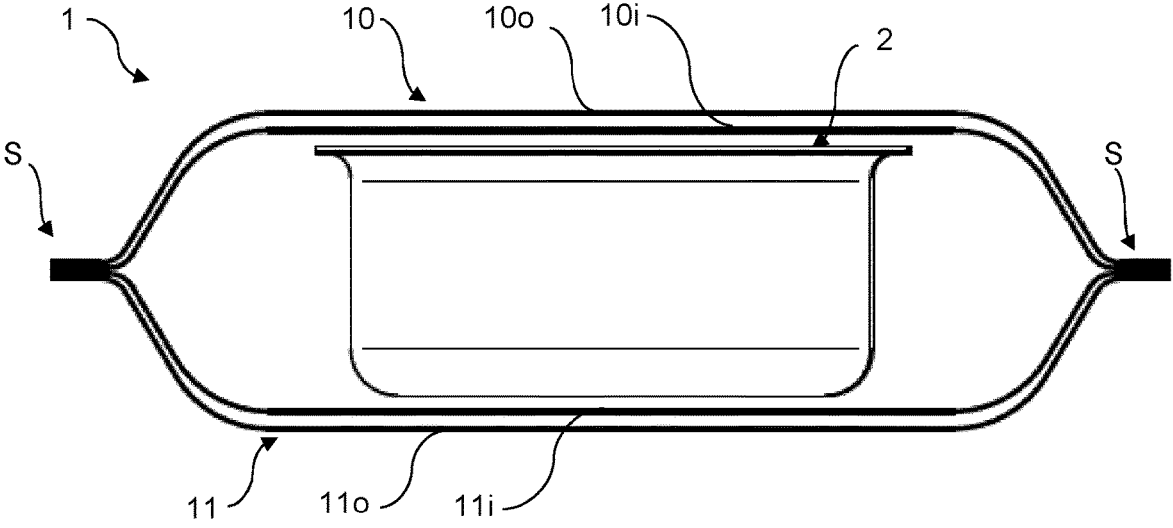
FIG. 2 is a schematic representation of a packaging according to a second embodiment.

FIG. 2 illustrates another embodiment of a header bag.

This header bag is similar to the one of FIG. 1, except that it does not include any porous wall.

The description of the elements presenting the same reference numbers as the ones of FIG. 1 remains applicable.

Thanks to the double-layered structure of each sheet forming the header bag and the vacuum within the sheet to apply the inner and outer layers against each other, it is possible to detect a breach in said sheet. Indeed, any breach or hole in the inner and/or outer layer has the effect of releasing the vacuum between the layers and of allowing entry of ambient gas (either from the inside or from the outside of the header bag) between the inner and outer layers.

This effect may be exploited in different ways to detect such a breach. Three embodiments of the detection will be described below.

According to a first embodiment, the penetration of gas between the inner and outer layers allows separating said layers from each other, which is not possible when vacuum is applied between said layers. For example, a user may pinch one of the layers (e.g. the outer layers) and pull it on while maintaining the other layer (e.g. the inner layer) in a substantially fixed position. The ability of the user to pull on one of the layers and thereby separate it from the other layer evidences that the vacuum has been released and thus that a breach has been made in at least one of the layers.

In order to render this way of detecting the breach easier, a pull tab may be provided on the outer layer. For example, the pull tab may be bonded to the outer layer. Typically, the pull tab may be bonded to the outer layer through an adhesive layer provided on the pull tab. Alternatively, the pull tab may also be thermically sealed to the outer layer. In this way, the user may grab the pull tab (which is easier than pinching the outer layer) and pull on it to try to separate the outer layer from the inner layer.

In some embodiments, the inner layer may be adhered to the intermediate packaging, for example using an adhesive patch, such as a double-sided tape. In this way, the inner layer may remain fixed to the medical device or to the intermediate packaging, which allows more easily separating the outer layer from the inner layer if a gas has been introduced between the layers due to a breach.

Figure 3:
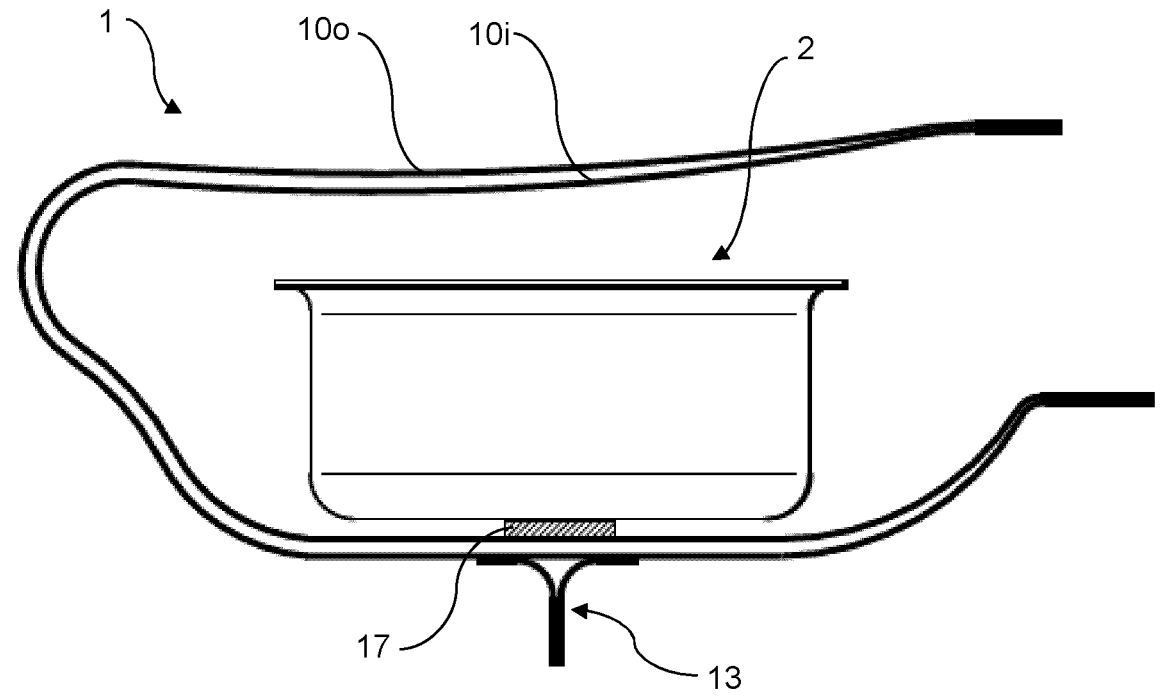
FIG. 3 is a schematic representation of a header bag according to a first embodiment.
Figure 4:
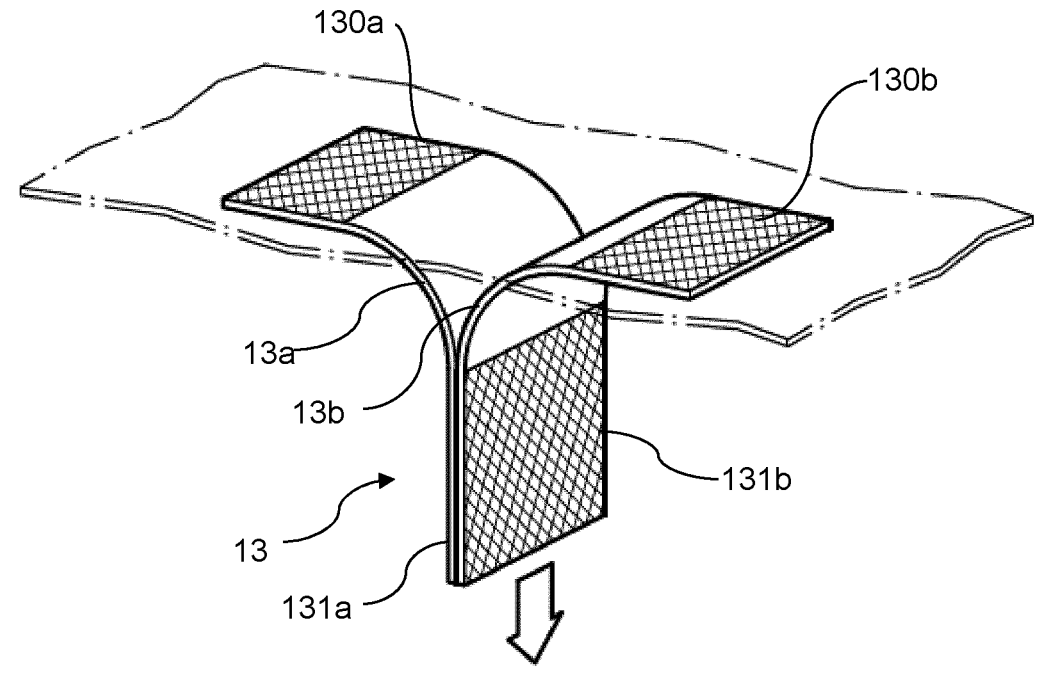
FIG. 4 is an enlarged partial view of the header bag of FIG. 3.

FIGS. 3 and 4 illustrate a header bag according to said first embodiment.

The header bag 1 may include or not a porous wall. The header bag may be formed of one of more double layer sheets as described above. Only one sheet comprising an inner layer 10i and an outer layer 10o is represented in FIG. 3.

The medical devices (not shown) are arranged in a tub 2, but in alternative embodiments one or more medical devices could be placed directly inside the header bag.

The inner layer 10i is adhered to the bottom of the tub by a double-sided tape 17.

A pull tab 13 is adhered to the outer layer 100.

As better seen in FIG. 4, which is an enlarged view of the portion of the outer layer 100 in the vicinity of the pull tab 13, the pull tab may be formed of two tapes 13a, 13b, wherein one end 130a, 130b of the tapes is bonded to the outer layer 10o and the opposite ends 131a, 131b of tapes 13a, 13b are bonded to each other. The bonding may be made directly if the tapes 13a, 13b have an adhesive face. Alternatively, the bonding may be made via glue or any other type of adhesive.

A user may then grab the bonded ends 131a, 131b to pull on the outer layer in the direction of the arrow.

Preferably, the pull tab 13 is located substantially on the side of the sheet opposite to the region which is adhered to the tub 2. In this way, the inner layer 10i may be firmly retained on the tub while a user pulls on the pull tab 13.

If the header bag comprises two or more double-layer sheets, a pull tab may be provided on each of the sheets to be able to detect a breach in each sheet.

According to a second embodiment, the penetration of gas between the inner and outer layers may be detected by an indicator sensitive to at least one property of the gas, located between the inner and outer layers.

For example, the indicator may be sensitive to a variation of gas concentration, such as humidity variation, or to a variation of pressure. The indicator is configured to change a visual aspect (e.g. color) in reaction to said property of the gas. Advantageously, said indicator is reversible, meaning that the change of visual aspect is reversible.

For example, the indicator may have a first color which is preserved as long as vacuum is maintained between the inner and outer layers, and which changes once the indicator has been exposed to air penetrating via a breach in at least one of the layers. Typically, indicators commercialized by OLIKROM may be used.

To allow a user to see this change of visual aspect of the indicator, the outer and/or inner layers may be transparent or translucent. This is the case in particular for a low density polyethylene layer as mentioned above.

FIGS. 5 and 6A-6B illustrate a header bag according to said second embodiment.

The header bag 1 is formed of two double layer sheets 10, 11. In the illustrated embodiment, the header bag 1 also comprises a porous wall 12 but this is optional.

Each sheet comprises an indicator 14 located between the inner and outer layers forming the respective sheet. When the header bag is formed, vacuum is applied between the inner and outer layers and the indicator is isolated from the ambient environment due to the fact that the layers are impervious to air. Each indicator may have a central portion and a peripheral portion. Vacuum may be created with a vacuum sealer equipped with a vacuum nozzle and bi-active sealing bars such as a MAGVAC™ machine.

As shown in FIG. 6A, the central portion 141 of indicator has a first color, which may be the same as the color of the peripheral portion.

When a hole H is made in the sheet 10, air from the outside of the header bag is allowed to penetrate between the inner and outer layers of this sheet. As a result, the corresponding indicator 14 is exposed to humidity contained in said air.

As shown in FIG. 6B, the central portion 141 of said indicator thus changes color. The peripheral portion 140 may remain of the same color.

A user may observe the color of each indicator through the inner and/or outer layer and then detect whether a change of color has occurred.

Of course, this embodiment is also applicable if the header bag is formed of only one double layer sheet. In this case, only one indicator may be necessary.

However, one may decide to put two or more indicators in a single sheet, located at different positions, for example to increase the possibility of detecting a breach over the entire surface of the sheet.

According to a third embodiment, the penetration of gas between the inner and outer layers may be detected by a pressure sensor located between the inner and outer layers. An RFID (radio-frequency identification) tag is also located between the inner and outer layers. The RFID tag is configured to communicate with the pressure sensor to record a change of pressure between the inner and outer layers detected by the pressure sensor.

The data recorded in the RFID tag may be read by an RFID reader 16 external to the header bag. A user may thus use the RFID reader to obtain information about the pressure between the inner and outer layers of the sheet to determine whether a breach in the sheet has been made.

Figure 7:
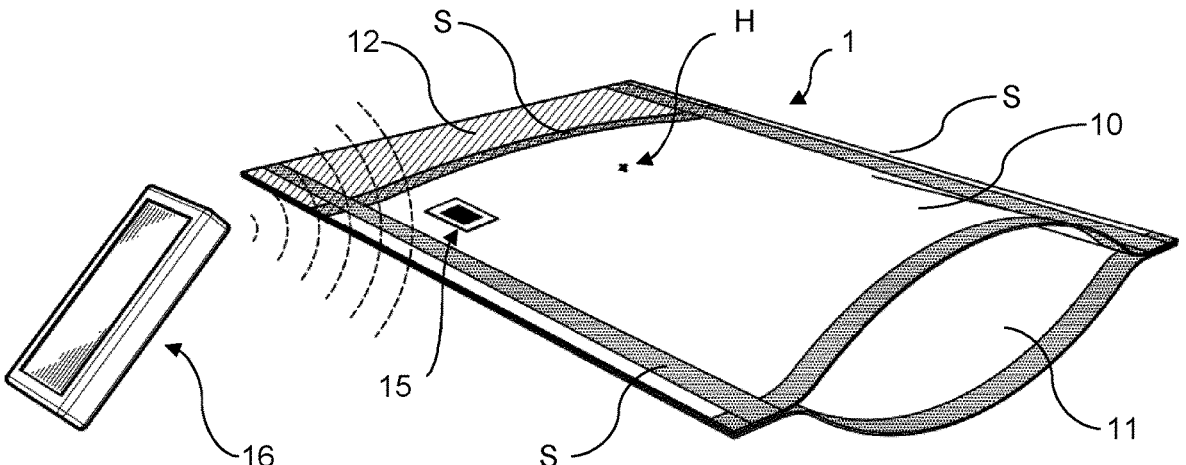
FIG. 7 is a schematic representation of a header bag according to a third embodiment, including a pressure sensor coupled to an RFID tag.

FIG. 7 illustrates a header bag according said third embodiment.

The header bag 1 is formed of two double layer sheets 10, 11. In the illustrated embodiment, the header bag 1 also comprises a porous wall 12 but this is optional.

Each sheet comprises a pressure sensor 15 associated with an RFID tag located between the inner and outer layers forming the respective sheet. Typically, sensors commercialized by ASYGN may be used; for example the ASX321x sensor. When the header bag is formed, vacuum is applied between the inner and outer layers and the pressure sensor may measure an initial pressure which corresponds to the vacuum.

When a hole H is made in the sheet 10, air from the outside of the header bag is allowed to penetrate between the inner and outer layers of this sheet. As a result, the corresponding the pressure between the inner and outer layers increases, and the pressure sensor measures a new pressure greater than the initial pressure. The measured pressure is recorded in a memory of the RFID tag.

When a user approaches an RFID reader 16 towards the header bag, the RFID reader is able to read data recorded in the RFID tag. Based on said data, the user may determine that a pressure increase has occurred and deduce that a breach has been made in the corresponding sheet.

Of course, this embodiment is also applicable if the header bag is formed of only one double layer sheet. In this case, only one sensor and RFID tag may be necessary.

In order to provide an additional means for detecting the breach, a pull tab may be provided on the outer layer, as already described with respect to the first embodiment.

More generally, two or more of the embodiments described above may be combined if this is technically feasible.

The manufacturing of the header bag mainly involves providing inner and outer layers at a suitable dimension to form a respective sheet, superimposing the inner and outer layers to form the sheet, and sealing the volume. Said sealing may be carried out for example by locally heating at least one of the inner and outer layers and applying a pressure to create a mechanical bond between said layers. Sealing could also be carried out with an adhesive locally implemented on the inner layer, the outer layer or both the inner and the outer layer. The sealing is continuous along the periphery of the sheet in order to have an airtight volume between the inner and outer layers.

The vacuum may be created in said volume during or after said sealing. In particular, the vacuum between the inner and outer layers is preferably created when the two inner and outer layers are sealed together. Alternatively, the vacuum may be created at a later stage of the packaging process, when the header bag is sealed in order to close the enclosure once the at least one medical device has been put inside the bag.

Then, the sheet may be sealed on itself or to another similar sheet to form the enclosure for the medical containers. If appropriate, at least one sheet is further sealed to a porous wall. To that end, the materials of the sheet(s) and of the porous wall have to be compatible to allow such a sealing. For example, the sheet(s) and porous wall may be made of same type of polymer, in order to be weldable with each other. In particular, polyethylene layers and a polyethylene non-woven may be sealed together.

FIG. 8 illustrates (from top to bottom) top, bottom and side views of a header bag according to an embodiment with two sheets and a porous wall configured to be sealed onto each other.

The top of the header bag comprises a first sheet 10 which is formed of an inner layer 10*i* and an outer layer 100 (see the side view) and a porous wall 12, each having a rectangular shape. The porous wall is sealed to the first sheet 10 along a common longitudinal side. The inner and outer layers 10*i*, 10*o* are sealed together along the three other sides of the sheet 10. Vacuum may be created between the inner and outer layers 10*i*, 10*o* during or after sealing of the layers. The sealing regions are designated by reference S.

The bottom of the header bag comprises a second sheet 11 which is formed of an inner layer 11*i* and an outer layer 110 (see the side view). The second sheet has a rectangular shape which is substantially identical to the shape of the assembly of the first sheet 10 and porous wall 12. The inner and outer layers 11*i*, 110 are sealed along the four sides of the sheet 11. Vacuum may be created between the inner and outer layers 11*i*, 110 during or after sealing of the layers.

The header bag may then be assembled by superimposing the assembly of the first sheet 10 and porous wall 12 onto the second sheet 11.

Then, sealing is carried out on three sides of the superimposed sheets. Said sealing may be made using the same technical means as the ones used to seal each individual sheet.

The fourth side is kept open in order to allow inserting the medical containers or intermediate packaging into the enclosure. In the illustrated embodiment (see the side view), the side opposite to the porous wall 12 is kept open. Said side may be sealed after the medical containers have been placed into the header bag.

The porous wall 12 is optional. In case no sterilization of the header bag is intended, the porous wall may be omitted and the header bag may be formed of the first and second sheets 10, 11 having similar dimensions.

FIG. 9 illustrates top, bottom and side views of a header bag according to an embodiment with a single sheet configured to be folded and sealed onto itself.

The header bag comprises a sheet 10 which is folded on itself to form both the top and the bottom of the header bag. The sheet 10 comprises an inner layer 10*i* and an outer layer 100 (see the side view). More precisely, the top of the header bag is formed of a part of the sheet 10 and a porous wall 12, each having a rectangular shape. The bottom of the header bag is formed of the remainder of the sheet 10.

The porous wall 12 is sealed to the sheet 10 along a common longitudinal side. The inner and outer layers 10*i*, 10*o* are sealed together along the three other sides of the sheet 10. As a result, the volume between layers 10*i* and 10*o* extends from the top to the bottom of the header bag. Vacuum may be created between the inner and outer layers 10*i*, 10*o* during or after sealing of the layers.

The header bag may then be assembled by folding the sheet 10 to form the top and bottom, and by sealing two sides of the folded sheet. Contrary to the previous embodiment, a third side (on the left of FIG. 9) does not require any sealing since it is formed by the fold of the sheet 10.

The fourth side is kept open in order to allow inserting the medical containers or intermediate packaging into the enclosure. In the illustrated embodiment (see the side view), the side opposite to the fold is kept open. Said side may be sealed after the medical containers have been placed into the header bag.

The invention claimed is:

1. A header bag for packaging at least one medical device, comprising:
at least one sheet configured to be sealed to form an enclosure for the at least one medical device, the at least one sheet comprising at least
an inner layer, wherein the inner layer defines the enclosure for the at least one medical device, and
an outer layer, wherein the inner and outer layers are in contact with each other;
wherein the inner and outer layers are impervious to gas so that a vacuum can be created in a volume extending between the inner and outer layers, wherein the volume extending between the inner and outer layers is separate from the enclosure,
wherein the header bag further comprises a pressure sensor arranged in the volume extending between the inner and outer layers and an RFID tag configured to communicate with the pressure sensor.

2. The header bag according to claim 1, further comprising a porous wall sealed to the at least one sheet to form a part of the enclosure.

3. The header bag according to claim 2, wherein the porous wall is made of a non-woven material comprising high-density polyethylene fibres, coated cellulose fibres, and/or uncoated cellulose fibres.

4. The header bag according to claim 1, wherein the at least one sheet is a single sheet configured to be folded and sealed onto itself to form the enclosure.

5. The header bag according to claim 1, wherein the at least one sheet is two sheets configured to be sealed onto each other to form the enclosure.

6. The header bag according to claim 1, further comprising an indicator located between the inner and outer layers, the indicator being configured to change a visual aspect upon exposure to a variation of pressure or of gas concentration such as a humidity variation.

7. The header bag according to claim 1, further comprising a pull tab attached to the outer layer.

8. The header bag according to claim 1, wherein the inner and outer layers of the at least one sheet comprise one of the following materials: polyethylene, in particular low-density linear polyethylene, polypropylene, and/or polyethylene terephthalate.

9. A packaging for at least one medical container, comprising a header bag according to claim 1, wherein the at least one medical container is arranged in the sealed enclosure and the volume between the inner and outer layers of the at least one sheet is under vacuum.

10. A process for packaging at least one medical container, comprising:
providing a header bag according to claim 1,
arranging the at least one medical container in the enclosure,
sealing the enclosure, and
creating a vacuum between the inner and outer layers of the at least one sheet.

11. The process according to claim 10, wherein the vacuum is created in the at least one sheet before providing the header bag.

12. The process according to claim 10, wherein the vacuum is created in the at least one sheet when sealing the enclosure containing the at least one medical container.

* * * * *